United States Patent
Park et al.

(10) Patent No.: US 10,674,457 B2
(45) Date of Patent: *Jun. 2, 2020

(54) METHODS AND ARRANGEMENTS TO COORDINATE COMMUNICATIONS IN A WIRELESS NETWORK

(71) Applicant: INTEL CORPORATION, Santa Clara, CA (US)

(72) Inventors: Minyoung Park, Portland, OR (US); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,917

(22) Filed: Nov. 8, 2018

(65) Prior Publication Data

US 2019/0313344 A1 Oct. 10, 2019

Related U.S. Application Data

(63) Continuation of application No. 15/070,940, filed on Mar. 15, 2016, now Pat. No. 10,172,099, which is a continuation of application No. 13/730,974, filed on Dec. 29, 2012, now Pat. No. 9,313,741.

(51) Int. Cl.
*H04W 52/28* (2009.01)
*H04W 76/28* (2018.01)
*H04W 52/02* (2009.01)

(52) U.S. Cl.
CPC ..... *H04W 52/287* (2013.01); *H04W 52/0229* (2013.01); *H04W 52/0238* (2013.01); *H04W 76/28* (2018.02); *H04W 52/0212* (2013.01); *H04W 52/0216* (2013.01); *H04W 52/0219* (2013.01); *Y02D 70/00* (2018.01); *Y02D 70/142* (2018.01); *Y02D 70/144* (2018.01)

(58) Field of Classification Search
CPC .......... H04W 52/287; H04W 52/0238; H04W 52/0229; H04W 76/28; H04W 52/0219; H04W 52/0216; H04W 52/0212; Y02D 70/142; Y02D 70/144; Y02D 70/00
See application file for complete search history.

(56) References Cited

U.S. PATENT DOCUMENTS

| | | | |
|---|---|---|---|
| 2004/0253996 A1* | 12/2004 | Chen | H04W 52/0216 455/574 |
| 2009/0189981 A1* | 7/2009 | Siann | H04N 7/183 348/143 |

(Continued)

*Primary Examiner* — Shailendra Kumar (57) ABSTRACT

Logic may comprise hardware and/or code to coordinate communications of wireless communications devices to reduce power consumption by stations. Logic may coordinate communications in an access point. Logic may generate and transmit a wake frame from the access point to the station to wake the receive circuitry of the station. Logic of the station may wake the receive circuitry from an idle mode, which may be a less linear and less sensitive mode, to a receiver (RX) active state, which is a high linear and high sensitivity mode. Once the receiver circuitry enters the RX active state, the station is ready to receive a transmission. Logic may implement the wake frame as a medium access control frame or as a null data packet, physical layer frame.

24 Claims, 7 Drawing Sheets

(56) References Cited

U.S. PATENT DOCUMENTS

| | | | | |
|---|---|---|---|---|
| 2012/0106418 A1* | 5/2012 | Xhafa | ............... | H04W 52/0216 |
| | | | | 370/311 |
| 2012/0275364 A1* | 11/2012 | Anderson | ......... | H04W 52/0219 |
| | | | | 370/311 |
| 2013/0329620 A1* | 12/2013 | Kim | .................. | H04W 52/0229 |
| | | | | 370/311 |

* cited by examiner

METHODS AND ARRANGEMENTS TO COORDINATE COMMUNICATIONS IN A WIRELESS NETWORK

CROSS-REFERENCE TO RELATED APPLICATIONS

This application is a continuation of, claims the benefit of and priority to previously filed U.S. patent application Ser. No. 13/730,974 filed Dec. 29, 2012, entitled "METHODS AND ARRANGEMENTS TO COORDINATE COMMUNICATIONS IN A WIRELESS NETWORK", which is a continuation of, claims the benefit of and priority to previously filed U.S. patent application Ser. No. 15/070,940 filed Mar. 15, 2016, entitled "METHODS AND ARRANGEMENTS TO COORDINATE COMMUNICATIONS IN A WIRELESS NETWORK", which are hereby incorporated by reference in their entireties.

BACKGROUND

The present disclosure relates generally to the field of wireless communications technologies. More particularly, the present disclosure relates to reducing power consumption by a station by waking receive circuitry of the station before receipt of data by the station.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for coordinating communications of devices on a network are described herein. Embodiments may comprise logic such as hardware and/or code to coordinate communications of wireless communications devices to reduce power consumption by stations. Many embodiments coordinate communications by implementing wake transmission logic in an access point. The wake transmission logic may generate and transmit a wake frame from the access point to the station to wake the receive circuitry of the station. Wake logic of the station may wake the receive circuitry from an idle mode, which may be a less linear and less sensitive mode, to a receiver (RX) active state, which is a high linear and high sensitivity mode. Once the receiver circuitry enters the RX active state, the station is ready to receive a transmission.

After receiving the data in one or more packets, the station may switch to a transmitter (TX) active state, in which the transmission circuitry of the station is ready to transmit, and then the station may transmit an acknowledgement (ACK) frame to the access point to indicate that the data was received.

In some embodiments, the wake frame may comprise a medium access control (MAC) wake frame. In such embodiments, the MAC wake frame may be a MAC control frame with a new subtype value indicative of a wake frame and may comprise a duration and a receiver address. In other embodiments, the wake frame may comprise a physical layer (PHY) wake frame. In such embodiments, the PHY wake frame may comprise a PHY frame with a new signal field that indicates that the PHY frame is a wake frame. The new signal field may also comprise the duration and the receiver address in the form of an association identifier or a partial association identifier. In further embodiments, the PHY wake frame may comprise a null data packet PHY frame. For instance, the PHY wake frame may not comprise a MAC payload or MAC protocol data unit, which may reduce the power consumption expended by the station that receives the PHY wake frame.

Various embodiments may be designed to address different technical problems associated with coordinating communications of devices. For instance, some embodiments may be designed to address one or more technical problems such as expenditure of power by a station waiting to receive a data packet from an access point. The technical problem of expenditure of power by a station waiting to receive a data packet from an access point may involve the station remaining in an RX idle state while the station waits for the access point to transmit the data.

Different technical problems such as those discussed above may be addressed by one or more different embodiments. For instance, some embodiments that are designed to address expenditure of power by a station waiting to receive a data packet from an access point may do so by one or more different technical means such as transmitting a wake frame to the station before transmitting the data. Further embodiments that are designed to address the station remaining in an RX idle state while the station waits for the access point to transmit the data may do so by one or more different technical means such as detecting the wake frame and switching the receive circuitry from an idle state to an RX active state.

IEEE 802.11 uses enhanced distributed channel access (EDCA) as a major channel access mechanism, which is based on carrier sense medium access/collision avoidance (CSMA/CA). Although EDCA is much simpler to implement and maintain compared to a scheduled channel access mechanism, it generally consumes more power. One major reason for this higher power consumption of the CSMA/CA is that a receiver does not know when there will be a packet transmitted for the receiver. For example, when a station (STA) sends a request frame such as a power-saving poll (PS-Poll) or Null Data frame to an access point (AP), the STA does not know when a response frame (e.g., a Data frame) will be received from the AP. The AP may be busy processing other tasks or the channel may be busy due to other's transmissions. However, to be ready to receive the response frame from the AP, the receive circuitries of the STA have to be active. In this state, the receiver is not receiving any useful information but just waiting for the response frame from the AP. This state is typically called as 'Receive (Rx) Idle' state.

When the STA is waiting for a frame destined for the STA, the RX circuitry operates in a highly linear, high sensitivity mode, so that the STA can receive a frame in any modulation and coding scheme (MCS). Basically, the receiver needs to operate in such a manner that it can receive high order modulation, e.g., up to 256 quadrature amplitude modulation (QAM), and high code rates with the best sensitivity it can support. Operating in such a state requires significant current draw to the RX circuitry and therefore increases power consumption. If the RX knows that the format of a transmission targeted for that STA is going to be the lowest modulation and code rate, the STA can wait in the RX Idle state so power consumption can be much lower than operating in this highly linear, high sensitivity mode, which is otherwise necessary if the STA is unaware of the transmission format.

In many embodiments, the STA's receiver does not have enough time to switch the RX circuitry from this high linearity/high sensitivity mode to a less linear, less sensitivity mode at the transition from the SIG field in a preamble of a frame to the Data field of the frame.

Moreover, the receiver circuitry needs to be in the high linearity/high sensitivity mode even for the packets that are not destined for the STA if the receiver does not know the destination information until it decodes the MAC header of the packet (assuming that the receiver address information is not contained in the PHY header).

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or other stations (STAs) such as cellular off-loading devices, routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
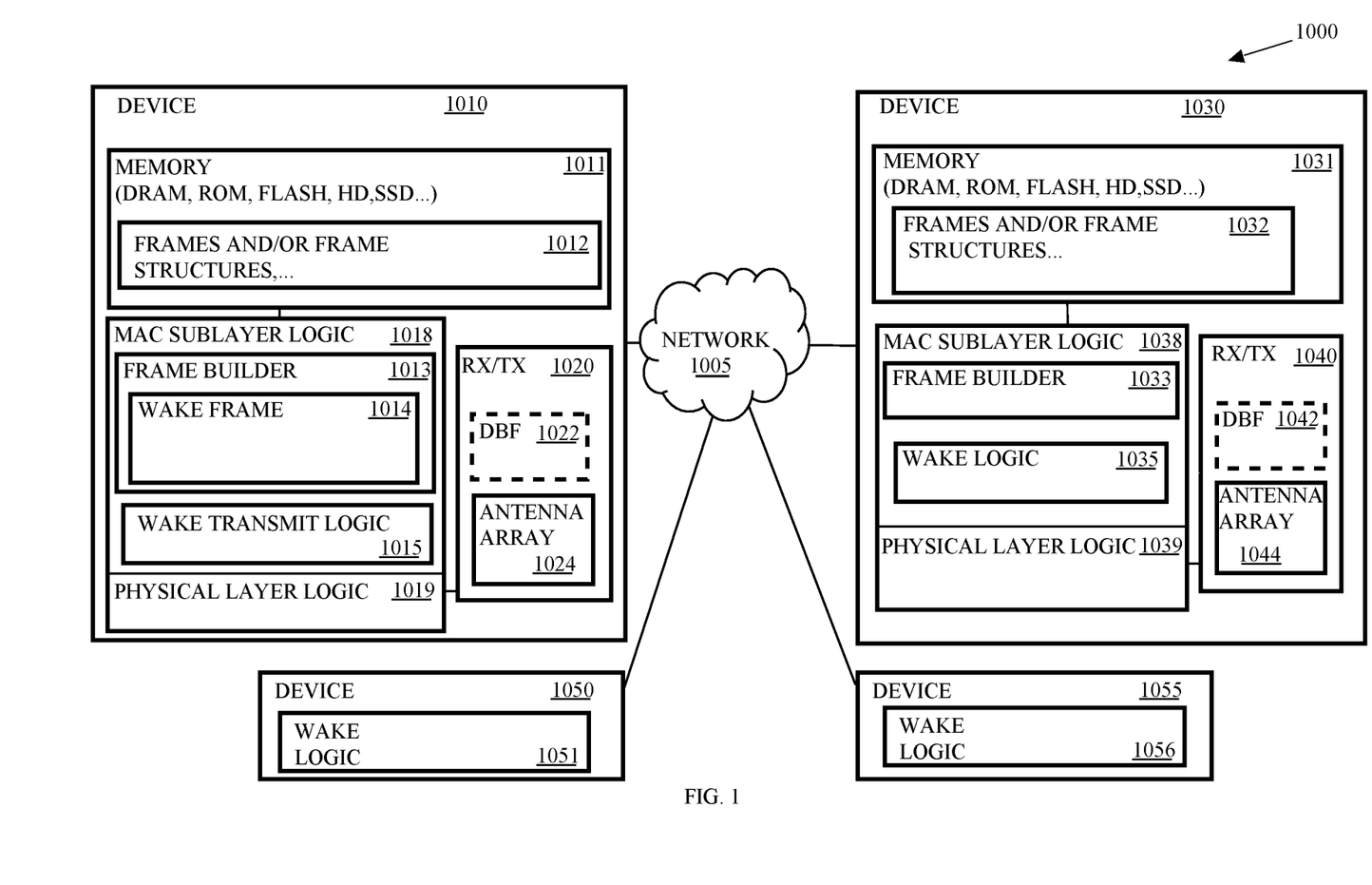
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications devices 1030, 1050, and 1055 may comprise low power communications devices such as sensors, consumer electronics devices, personal mobile devices, or the like. For example, the communications device 1010 may comprise a metering substation for water consumption within a neighborhood of homes. Each of the homes within the neighborhood may comprise a sensor such as the communications devices 1030, 1050, and 1055 and the communications devices 1030, 1050, and 1055 may be integrated with or coupled to water meter usage meters.

In some embodiments, the communications device 1010 may comprise wake transmit logic 1015 to determine a wake frame 1014 and to transmit the wake frame 1014 to devices such as the communications devices 1030, 1050, and 1055, which are associated with the communications device 1010. In some embodiments, the wake transmit logic 1015 may comprise part medium access control (MAC) logic such as MAC sublayer logic 1018 and part physical layer (PHY) logic such as PHY logic 1019. For instance, in several embodiments, wake transmit logic 1015 may generate a wake frame 1014 within the MAC sublayer logic 1018 and instruct the PHY logic 1019 to transmit the wake frame 1014 to a station such as the communications device 1030, 1050, or 1055, just prior, e.g., a short interframe space (SIFS) or less, transmission of a data packet to the station. In some embodiments, the wake frame 1014 is generated by the MAC sublayer logic 1018 as, e.g., a control frame and passed to the PHY logic 1019 to encapsulate the frame 1014 with a preamble and to transmit the frame 1014 to the station.

In other embodiments, the wake transmit logic 1015 may receive an indication from the MAC logic that the communications device 1010 is about to transmit a data packet to the station. In response, the wake transmit logic 1015 may instruct wake transmit logic of the PHY logic 1019 to transmit a PHY wake frame to the station as well as provide the PHY logic 1019 a duration and a receiver address for the targeted communications device such as the communications device 1030. The MAC sublayer logic 1018 may then generate a data packet and instruct the PHY logic 1019 to transmit the data packet after a SIFS.

In many embodiments, the PHY wake frame may be a null data packet (NPD) frame may comprise six orthogonal frequency division multiplexing (OFDM) symbols. For instance, the length of the PHY wake frame may be six symbols times the length of the symbol, e.g., 40 microseconds, for a total of, e.g., 240 microseconds. In other embodiments, the PHY wake (or synch) frames may comprise more or less symbols and, in several of such embodiments, the PHY wake (or synch) frame may comprise a MAC protocol data unit (MPDU) as a payload.

The station such as the communications device 1030 may comprise wake logic 1035 to receive the wake frame from the communications device 1010 and to wake the receive (RX) circuitry of the transceiver (RX/TX) 1040 from an idle state to an RX active state to receive the data packet from the communications device 1010. In some embodiments, the wake logic may reside in part in the PHY logic 1039 and may receive and interpret a PHY wake frame and pass the receiver address and duration to the MAC sublayer logic 1038. The wake logic 1035 may then wake the RX circuitry of the RX/TX 1040.

In several embodiments, stations such as the communications devices 1030, 1050, and 1055 may comprise wake logic 1035, 1051, and 1056, respectively, to determine to wake RX circuitry from an idle state to a high linearity/high sensitivity mode such as an RX active state in response to receipt of a wake frame such as the wake frame 1014. In several embodiments, the communications device 1030 may switch to a transmit (TX) active state to respond to receipt of the data packet with an acknowledgement (ACK).

In many embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the wake frames, and/or the frame structures. In many embodiments, memory 1011 and 1031 may store management frames, control frames, and data frames, which may comprise fields based upon the structure of the standard frame structures identified in IEEE 802.11.

Figure 1A:
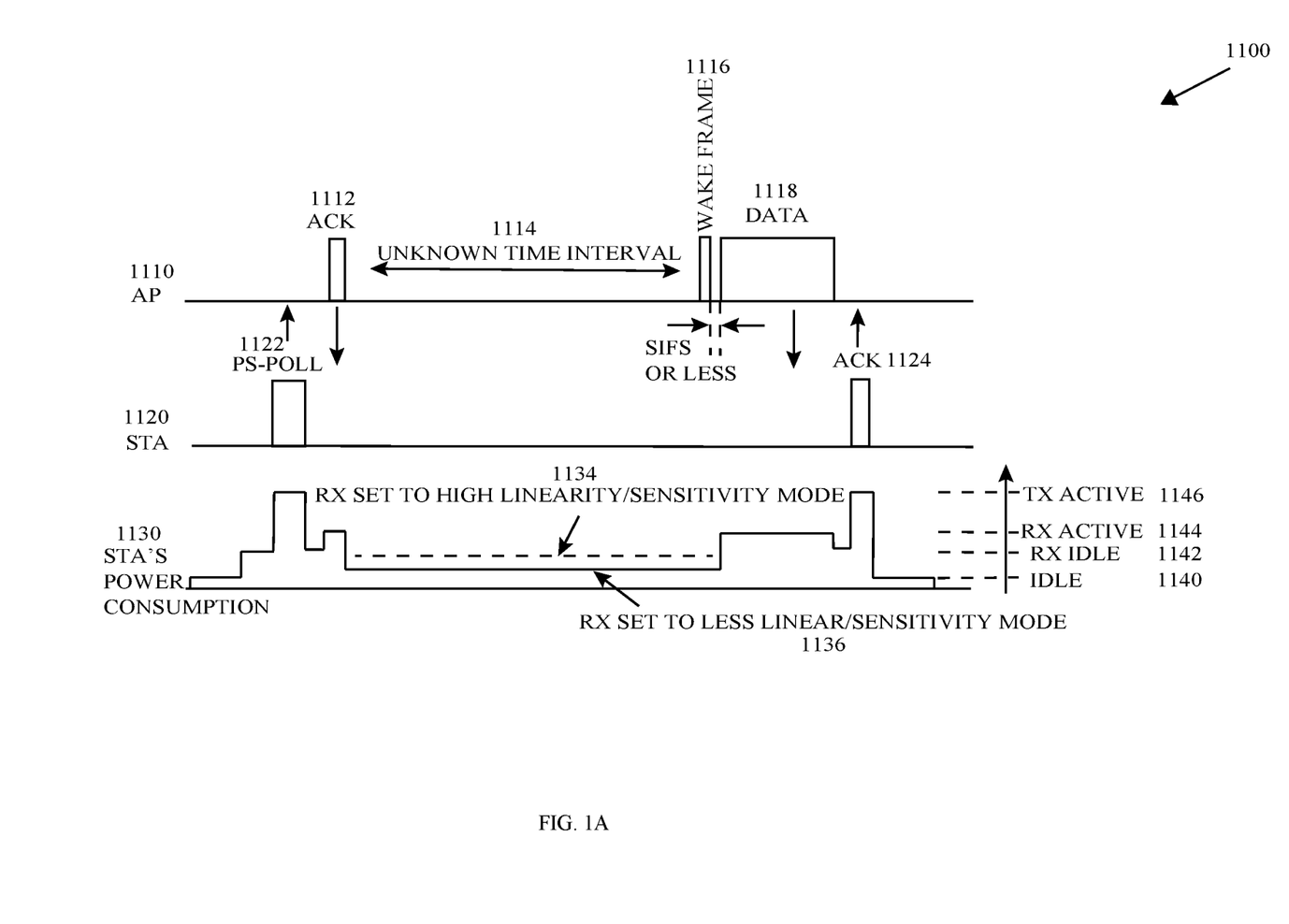
FIG. 1A depicts an embodiment of a timing diagram of communications between an access point and a station along with the corresponding power consumption states of the station.

FIG. 1A depicts an embodiment of a timing diagram 1100 of communications between an access point (AP) 1110, such as the communications device 1010, and a station (STA) 1120, such as the communications device 1030, along with the corresponding power consumption 1130 of the STA 1120. The STA 1120 stays in the Idle state 1140 (the lowest power consumption mode) such as a doze mode. The STA 1120 wakes up and sends a power-saving poll (PS-Poll) 1122 or another trigger frame to the AP 1110 to see if there is a buffered data at the AP 1110 for the STA 1120. The AP 1110 responds with an ACK frame 1112 with the More Data field set to one indicating that there is at least one packet buffered at the AP 1110 for the STA 1120. The STA 1120 switches back to the RX Idle state 1142 after the reception of the ACK 1112 and places the RX circuitry back to the less linear/sensitive mode 1136 to minimize the power consumption. When the AP 1110 is ready to send a data packet 1118 to the STA 1120, the AP 1110 transmits a Wake frame 1116 destined for the STA 1120 after an unknown time interval 1114 and before transmitting the data packet 1118.

The STA 1120 decodes the Wake frame 1116 and determines if the RA field (AID (association ID) or partial AID) matches the STA's 1120 address. If the Wake frame 1116 is addressed to the STA 1120, the STA 1120 puts its RX circuitry back to the high linearity/sensitivity mode 1134 and turns on other parts of the radio (such as parts of the RX/TX 1040) to get ready for reception of the data packet 1118. At this point, the STA 1120 is in the RX Active state 1144. Otherwise, the STA 1120 stays in the RX Idle state 1142 in which the RX circuitry is in the less linear/sensitivity mode 1136.

The AP 1110 transmits the data packet 1118 after SIFS (or shorter IFS time) so that the receiver has time to configure the RX circuitry back to the high linearity/sensitivity mode 1134. After receiving the data packet 1118, the STA 1120 returns to either the RX Idle state 1142 waiting for another data packet if the More Data field in the data packet 1118 received is set. Otherwise, the STA 1120 may switch to a TX active state 1146 and transmit an ACK 1124 to indicate to the AP 1110 that the data packet 1118 was received. Then the STA 1120 may return to the Idle state 1140 to save power.

Figure 1B:
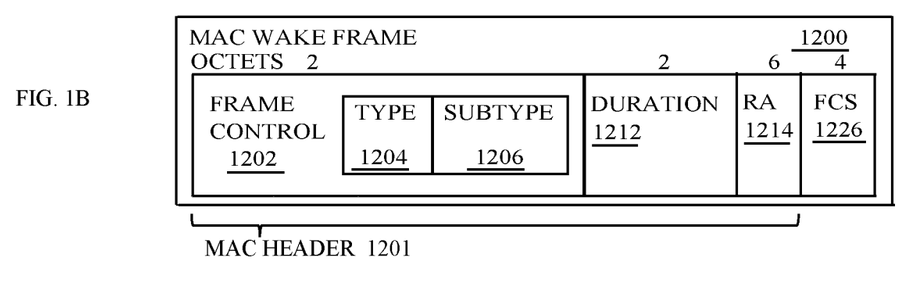
FIG. 1B depicts an embodiment of a medium access control wake frame.

FIG. 1B depicts an embodiment of a MAC wake frame 1200 for communications between wireless communication devices such as communications devices 1010, 1030, 1050, and 1055 in FIG. 1. The MAC wake frame 1200 may comprise a control frame and may comprise a MAC header 1201 and a frame check sequence (FCS) field 1226. The MAC header 1201 may comprise the frame control field 1202 with a type 1204 subfield and a subtype 1206 subfield. The type 1204 may indicate that the MAC wake frame 1200 is a control frame and the subtype 1206 may indicate that the frame is a wake frame. The frame control field 1202 may be two octets. In some embodiments, the MAC header 1201 may comprise other MAC header fields.

The MAC wake frame 1200 may comprise, for example, a duration 1212 field and a receiver address (RA) 1214 field. The duration 1212 may comprise an indication of the time required to complete a pending data transaction such as the time required to receive the data packet that will follow the wake frame. The RA 1214 may comprise the address of the STA that is the intended immediate recipient of the individually addressed frame(s) following the Wake frame. And the frame check sequence (FCS) field 1226 may comprise extra checksum characters added to the frame for error detection, which may check for errors such as random changes to data of the MAC wake frame 1200.

Figure 1C:
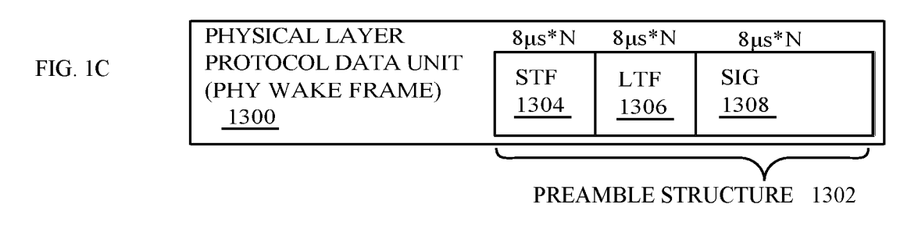
FIG. 1C depicts an embodiment of a physical layer wake frame.

FIG. 1C depicts an alternative embodiment of a physical layer protocol data unit (PPDU) 1300 of a PHY wake frame with null data packet (NDP), also referred to as an NDP-Wake Frame, with a preamble structure 1302 for establishing communications between wireless communication devices such as communications devices 1010, 1030, 1050, and 1055 in FIG. 1. To reduce the overhead of the wake frame, for, e.g., 802.11ah devices, the wake frame is defined in the form of the NDP-Wake frame and the bits in the SIGNAL field, SIG 1308, are repurposed to contain the information for the wake frame.

The PPDU 1300 may comprise a preamble structure 1302 including orthogonal frequency division multiplexing (OFDM) training symbols for a single multiple input, and multiple output (MIMO) stream followed by a signal field. In particular, the PPDU 1300 may comprise a short training field (STF) 1304, a long training field (LTF) 1306, and the SIG 1308. The STF 1064 may comprise a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1304 at a 20 MHz channel spacing is 8 μs times N.

The LTF 1306 may comprise a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1306 at a 20 MHz channel spacing is 8 μs times N.

The SIG 1308 may comprise a GI symbol at 0.8 μs times N and signal field symbols at 7.2 μs times N. In the present embodiment, the total length of the NDP-Wake frame 1300 can be just 6 symbols long (240 μs for 40 μs symbol time). The SIG 1308 is 2 OFDM symbols for 2 MHz or larger channel bandwidths in 802.11ah devices, which can contain 52 bits with BPSK ½ rate coding. For 1 MHz bandwidth mode, the SIG 1308 may contain 36-48 bits with, e.g., 6-8 OFDM symbols.

Figure 1D:
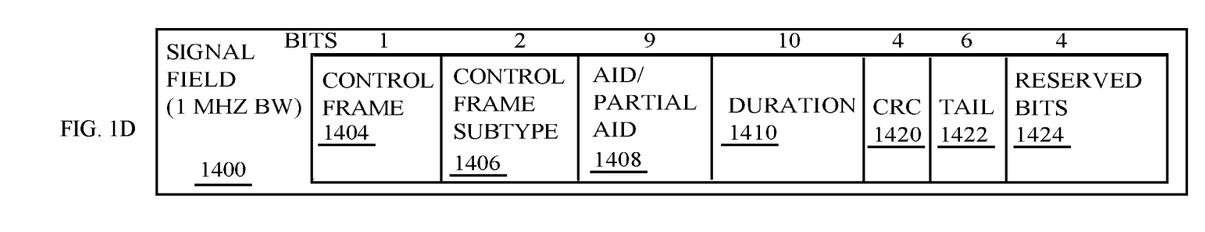
FIG. 1D depicts an embodiment of a signal field for a physical layer wake frame for a one MegaHertz bandwidth such as the physical layer wake frame in FIG. 1C.

FIG. 1D depicts an embodiment of a signal field, SIG 1400 for establishing communications at a one MHz bandwidth between wireless communication devices such as communications devices 1010, 1030, 1050, and 1055 in FIG. 1. While the number, types, and content of the fields may differ between embodiments, the present embodiment may comprise a signal field with a sequence of bits for a control frame 1404 parameter, a control frame subtype 1406 parameter, an association identifier (AID)/partial AID 1408 parameter, a duration 1410 parameter, a cyclic redundancy check (CRC) 1420 parameter, a tail 1422 parameter, and, in some embodiments, reserved bits 1424.

The control frame 1404 parameter may comprise 1 bit and may comprise an indication of the type of signal field so the receiving device can determine if this signal field is a normal signal field in, e.g., an IEEE 802.11ah device, or if this signal field is a signal field for a null data packet (NDP) frame. In some embodiments, the control field 1404 is set to zero for a normal signal field and is set to one for an NDP frame.

The control frame subtype 1406 parameter may comprise 2 bits and may indicate the sub-type of the control frame such as an NDP-Wake frame subtype with a value of 00. In further embodiments, the control frame subtype 1406 parameter values may comprise 01, 10, and 11 in binary.

The AID/partial AID 1408 parameter may comprise 9 bits and may designate, for the 1 MHz bandwidth, the partial AID of the receiver STA that is the intended immediate recipient of the individually addressed frame(s) following the NDP wake frame.

The duration 1410 parameter may comprise 10 bits and may designate the time required to complete the transaction of the pending data to be transmitted within a SIFS after the NDP wake frame. The duration 1410 may comprise the number of symbols in the transmission and may range from 0 to 1023 in 40 μs units, covering 0-40 milliseconds (ms).

The cyclic redundancy check (CRC) 1420 sequence parameter may comprise a four bit hash of SIG 1400 for error checking and the tail 1422 parameter may comprise a six bit sequence of, e.g., logical zeros or ones, to designate the end of the signal field, SIG 1400.

Some embodiments may also comprise the reserved bits 1424. The reserved bits 1424 may be 4 bits in length and may be used to indicate, e.g., the modulation and coding scheme (MCS) used in the data packet that follows the NDP-Wake frame after SIFS (or shorter IFS). In such embodiments, the reserved bits 1424 may inform the receiver the exact MCS mode in which the receiver should operate. If the modulation and coding rate does not require a highly linear/high sensitivity mode, the receiver may be able to enter a lower power consumption mode for receiving the data. The reserved bits 1424 may comprise other information in other embodiments or may not be included the SIG 1400 in further embodiments.

Figure 1E:
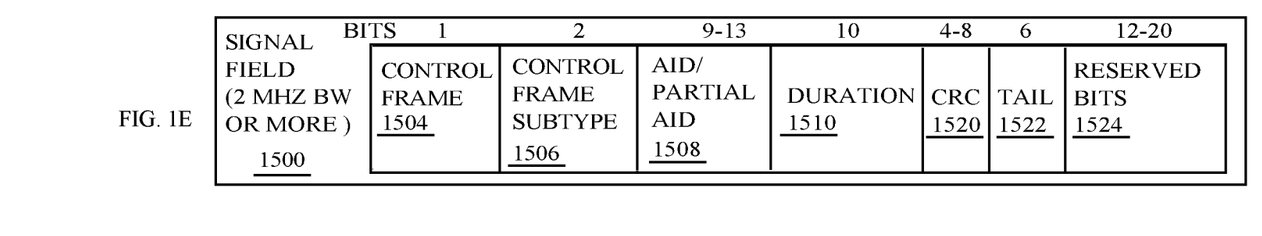
FIG. 1E depicts an embodiment of a signal field for a physical layer wake frame for a two or more MegaHertz bandwidth such as the physical layer wake frame in FIG. 1C.

FIG. 1E depicts an embodiment of a signal field, SIG 1500 for establishing communications at a two or more MHz bandwidth between wireless communication devices such as communications devices 1010 and 1030 in FIG. 1. The present embodiment may comprise a signal field with a control frame 1504 parameter, a control frame subtype 1506 parameter, an association identifier (AID)/partial AID 1508 parameter, a duration 1510 parameter, a cyclic redundancy check (CRC) 1520 parameter, a tail 1522 parameter, and, in some embodiments, reserved bits 1524. Other embodiments may comprise some or all of these fields and/or other fields conveying at least the duration and the receiver address for a subsequent data packet.

The control frame 1504 parameter may comprise 1 bit and may comprise an indication of the type of signal field so the receiving device can determine if this signal field is a normal signal field or if this signal field is a signal field for a null data packet (NDP) frame. The control frame subtype 1506 parameter may comprise 2 bits and may indicate the subtype of the control frame such as an NDP-Wake frame subtype with a value of 00.

The AID/partial AID 1508 parameter may comprise 9 bits for embodiments that transmit a partial AID or 13 bits for embodiments that transmit a full AID. The AID/partial AID 1508 parameter may designate the AID or partial AID of the receiver STA that is the intended recipient after an interframe space (IFS) such as a SIFS or shorter IFS of data frame(s) following the NDP wake frame.

The duration 1510 parameter may comprise 10 bits and may designate the time period to complete the transmission of the pending data to be transmitted after the NDP wake frame. In many embodiments, the duration 1510 may comprise the number of symbols in the transmission and may range from 0 to 1023 in 40 μs units, covering 0-40 milliseconds (ms).

The cyclic redundancy check (CRC) 1520 sequence parameter may comprise a 4 to 8 bit hash of SIG 1500 for error checking and the tail 1522 parameter may comprise a 6 bit sequence of, e.g., logical zeros or ones, to designate the end of the signal field, SIG 1500.

Further embodiments may comprise the reserved bits 1524. The reserved bits 1524 may be used to indicate the modulation and coding scheme (MCS) used in the data packet that follows the NDP-Wake frame so that the receiver can know the exact MCS mode it should operate. Knowing the exact MCS mode in which the receiver should operate allows the receiver to operate in a lower power consumption mode, in some embodiments, for receiving the data.

In some embodiments, the reserved bits 1524 may comprise four bits and may designate, e.g., binary phase-shift keying (BPSK), 16-point constellation quadrature amplitude modulation (16-QAM), 64-point constellation quadrature amplitude modulation (64-QAM), 256-point constellation quadrature amplitude modulation (256-QAM), quadrature phase-shift keying (QPSK), or staggered quadrature phase-shift keying (SQPSK) as a modulation format for a communication. The selections may offer one to four spatial streams for the communication. The BPSK may have a coding rate of ½. The 256-QAM may have a coding rate of ¾. And the SQPSK, also referred to as OQPSK, may have a coding rate of ½ or ¾. In some embodiments, SQPSK is a modulation format on the signal and data fields to extend the range of operation of the communications devices for, e.g., outdoor sensor monitoring.

Figure 1F:
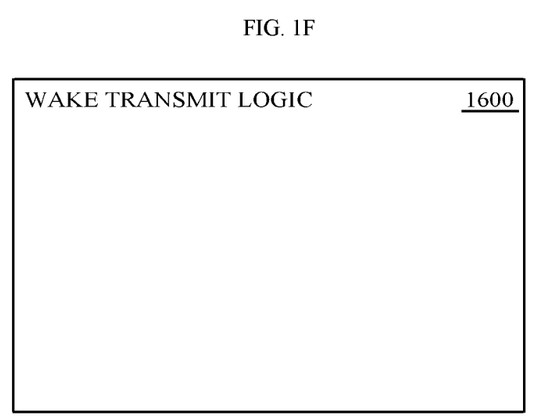
FIG. 1F depicts an embodiment of wake transmit logic for the system illustrated in FIG. 1.

FIG. 1F illustrates an embodiment of wake transmit logic 1600 such as the wake transmit logic 1015 illustrated in FIG. 1. The wake transmit logic 1600 may comprise MAC logic and/or PHY logic to determine a wake frame including a receiver address of the target device for a data transmission and a duration to describe the length of the data transmission. The wake transmit logic 1600 may then transmit the wake frame to the target device for the data transmission to inform the target device that the data will follow after a minimal delay, which accommodates switching from an idle state to an RX active state by the target device to receive the transmission. In some embodiments, the wake frame may comprise a MAC frame encapsulated in a PHY frame and, in further embodiments, the wake frame may comprise a PHY frame with no MAC data payload.

In several embodiments, the wake transmit logic 1600 may receive an indication that the MAC logic is ready to send the data transmission and this indication may trigger the generation and transmission of the wake frame. In other embodiments, the wake transmit logic 1600 may receive an indication that the MAC logic will be ready to send the data transmission within an interframe space and this indication may trigger the generation and transmission of the wake frame.

Figure 1G:
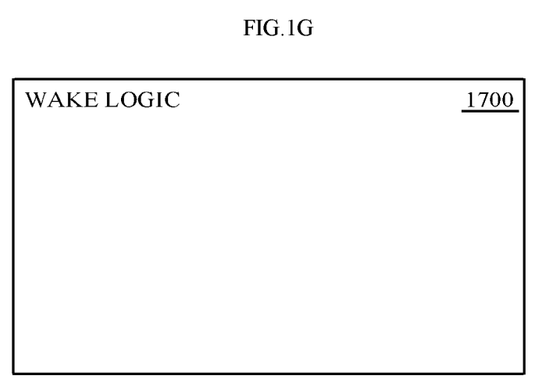
FIG. 1G depicts an embodiment of wake logic for the system illustrated in FIG. 1.

FIG. 1G illustrates an embodiment of wake logic 1700 such as the wake logic 1035, 1051, and 1056 illustrated in FIG. 1. The wake logic 1700 may comprise MAC logic and/or PHY logic to receive a wake frame including a receiver address of the target device for a data transmission and a duration to describe the length of the data transmission, and to interpret the wake frame to determine whether the receiver address corresponds to their respective receivers. In response to receiving a wake frame addressed the receiver for the wake logic 1700, the wake logic 1700 may instruct the PHY to switch the RX circuitry and possibly other circuitry to a ready to receive state such as an RX active state. On the other hand, if the wake frame is not addressed to the receiver of the wake logic 1700, the wake logic 1700 may do nothing or instruct the receiver to remain in or enter an idle state.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames 1014. The PHY logic 1019, 1039 may generate physical layer protocol data units (PPDUs) based upon the frames like frame 1014. More specifically, the frame builders 1013 and 1033 may generate the frames and data unit builders of the PHY logic 1019, 1039 may encapsulate the frames with preambles to generate PPDUs for transmission via a physical layer device such as the transceivers (RX/TX) 1020 and 1040. Note that the PHY may refer to the PHY logic 1019, 1039 and the PHY devices such as the transceivers (RX/TX) 1020 and 1040.

The frame 1014, also referred to as a MAC layer Service Data Unit (MSDU), may comprise a control frame. In further embodiments, PHY logic 1019 may generate and transmit wake frames prior to transmission of MAC data frames in response to instructions from the MAC sublayer logic 1018.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal subcarrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. A guard interval may be inserted between symbols such as the short training field (STF) and long training field (LTF) symbols during transmission to avoid inter-symbol interference (ISI), which might result from multi-path distortion. Guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
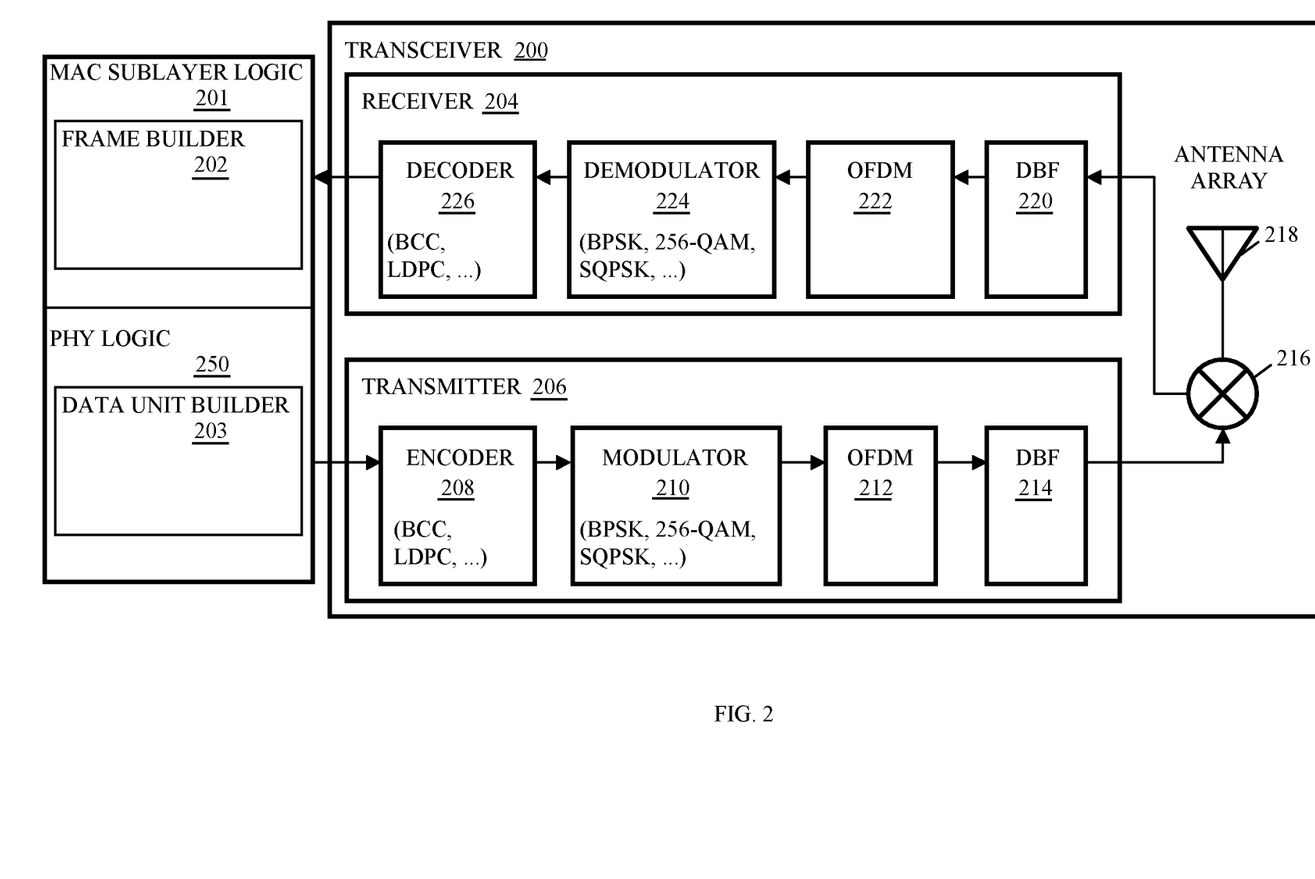
FIG. 2 depicts an embodiment of an apparatus to coordinate communications.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as a control frame and transmit the frame to the physical layer (PHY) logic 250. The PHY logic 250 may determine the physical layer convergence procedure protocol data unit (PPDU) by determining a preamble and encapsulating the frame with a preamble to transmit via transceiver 200. In other embodiments, the MAC sublayer logic 201 may instruct PHY logic 250 to transmit a PHY wake frame. The PHY logic 250 may determine the physical layer convergence procedure protocol data unit (PPDU) by determining a wake frame with a preamble to transmit via transceiver 200.

In many embodiments, the MAC sublayer logic 201 may comprise a frame builder 202 to generate MAC frames, or MAC protocol data units (MPDUs). The MAC sublayer logic 201 may then receive and parse and interpret a response frame. In many embodiments, the MAC sublayer logic 201 may comprise logic to determine a duration and receiver address associated with a MAC wake frame. In other embodiments, PHY logic 250 may comprise logic to determine a duration and receiver address associated with a PHY wake frame and instruct the MAC sublayer logic 201 of the duration and receiver address. The MAC sublayer logic 201 may then instruct the PHY logic 250 to switch from an idle state to an RX active state if the wake frame is addressed to the MAC address or AID associated with the receiver 204.

The PHY logic 250 may comprise a data unit builder 203. The data unit builder 203 may determine a preamble and the PHY logic 250 may encapsulate the MPDU with the preamble to generate a PPDU. In some embodiments, the PHY logic 250 may generate and transmit the PHY wake frame based upon an address and duration received from the MAC sublayer logic 201. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame. Based upon this information, the MAC sublayer logic 201 may determine contents such as field values in the frame.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3A:
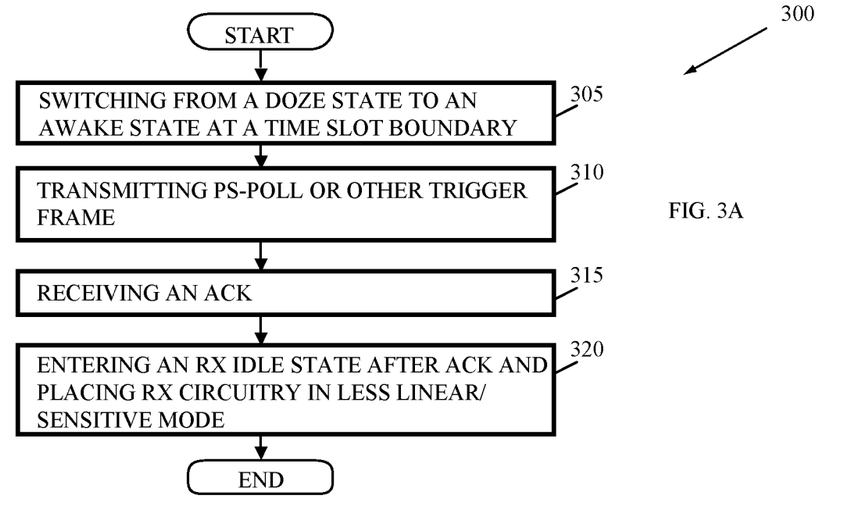
FIGS. 3A-C depict embodiments of flowcharts to coordinate communications.
Figure 3B:
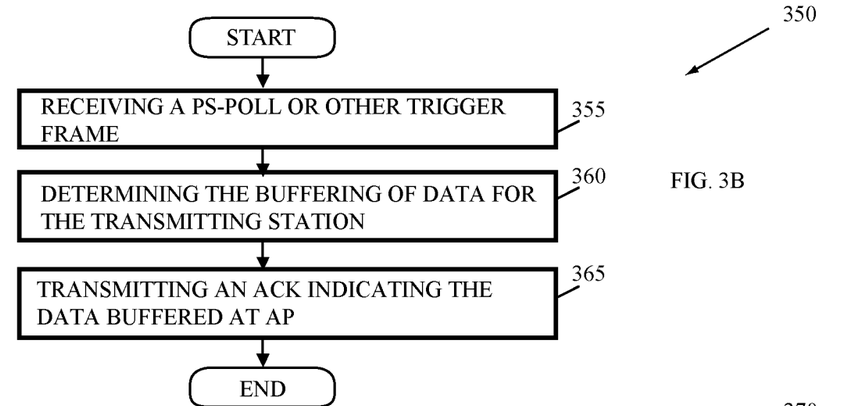
Figure 3C:
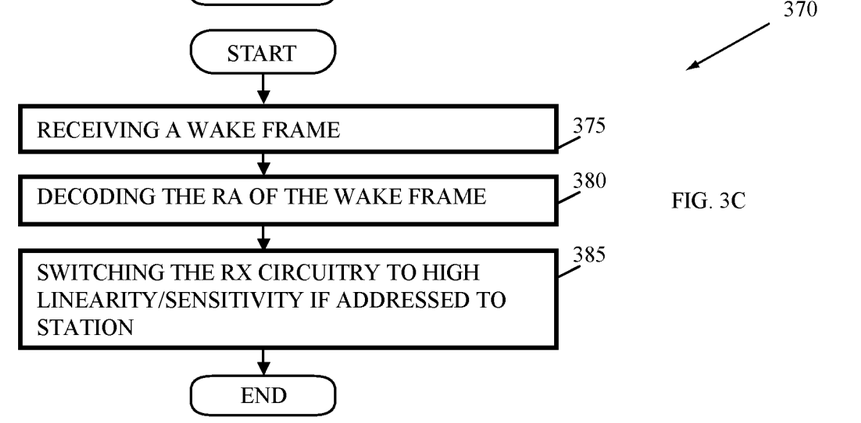

FIGS. 3A-C depict embodiments of flowcharts 300, 350, and 370 to coordinate communications. Referring to FIG. 3A, the flowchart 300 begins with switching from an idle state to a TX active state (element 305). In some embodiments, the STA stays in the Idle state (the lowest power consumption mode) until an action is required such as a periodic reporting of sensor data to an AP or retrieving data buffered by the AP. The STA may generate and transmit the sensor data or a PS-Poll to the AP (element 310) and the transmission of the sensor data or the PS-Poll may act as a trigger to cause the AP to transmit data buffered at the AP to the STA.

After transmitting the trigger to the AP, the STA may switch to a receive active state to receive an acknowledgement responsive to the communication. The STA may receive an ACK from the AP to acknowledge that the trigger was received (element 315) and a more data field of the ACK may be set to one to indicate that the STA has data buffered at the AP, which will be transmitted to the STA. The STA may then enter an idle state to reduce power consumption by the receive circuitry, which places the receive circuitry in a less linear and less sensitive mode (element 320).

In FIG. 3B, the flowchart 350 begins with receiving, by an AP, a PS-Poll or other trigger frame (element 355). In some embodiments, MAC logic of the AP may parse the frame to determine that the frame is a PS-Poll frame or another trigger frame from the STA and this may trigger a process to determine whether the AP is buffering data for the STA (element 360).

After determining that data is buffered at the AP for the STA, the AP may transmit an ACK to the STA to indicate that the AP is buffering data and will transmit the data to the STA (element 365). In several embodiments, the AP may be involved with other processes and/or other data transmissions to other stations so the time interval between the receipt by the AP of a trigger frame and the transmission of data buffered for the station to the station may be unknown at the time the ACK is transmitted to the STA.

In FIG. 3C, the flowchart 370 begins with receiving a wake frame (element 375). In many embodiments, the AP may transmit a wake frame to the STA and each STA in the basic service set that receives the wake frame may determine whether the wake frame is addressed to that particular STA or not. In order to determine whether the wake frame is addressed to the STA or not, the STA may decode the receiver address of the wake frame (element 380). If the wake frame is a PHY layer frame then the STA may determine the receiver address from the signal field. On the other hand, for embodiments in which the wake frame is a MAC frame, the wake logic of the AP may decode the RA field of the MAC frame to determine the receive address. In some embodiments, determining, by the station, that the receive address is associated with the station comprises parsing the wake frame to determine that the frame is a wake frame and then parsing the wake frame to determine the receiver address.

Upon determining that the wake frame is addressed to the station, the station may switch the receive circuitry to enter a high linearity/high sensitivity mode (element 385). The STA may also turn on other parts of the radio to prepare for data reception of, e.g., an unknown MCS. At this point, the STA is in the Rx Active state.

Figure 4:
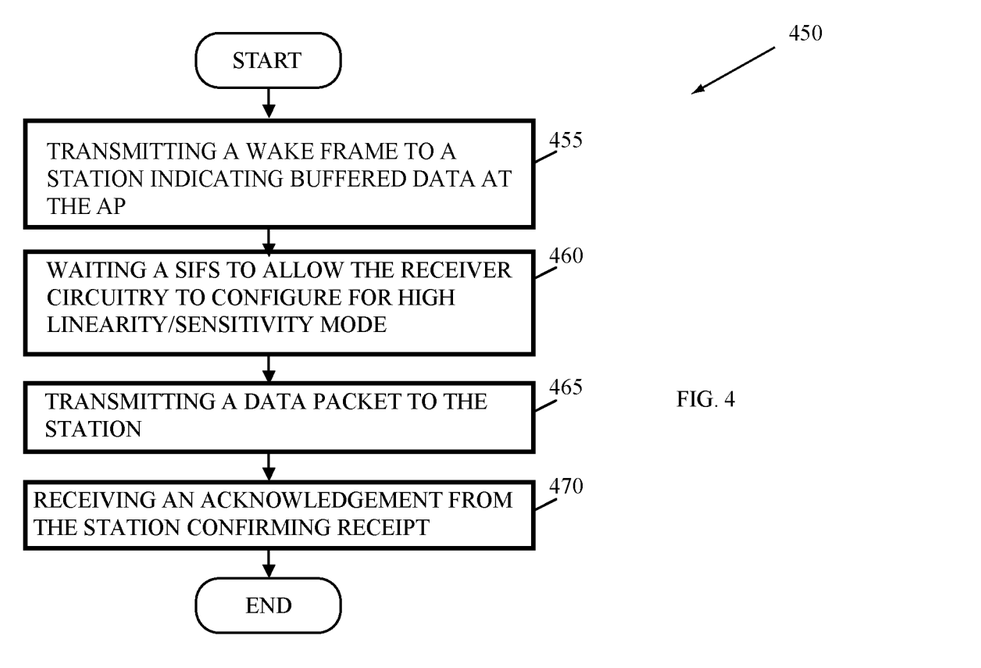
FIG. 4 depicts an embodiment of a flowchart to coordinate communications as illustrated in FIG. 2.

FIG. 4 depicts an embodiment of flowchart 450 to coordinate communications as illustrated in FIG. 2. The flowchart 450 begins with transmitting a wake frame to a STA indicating buffered data at the AP is about to be transmitted (element 455). In some embodiments, the AP may comprise wake logic to generate and transmit a MAC wake frame. In several embodiments, the MAC wake frame may comprise a control frame type with a new wake frame subtype, a duration of the pending data transmission, and a receiver address. In other embodiments, the AP may comprise wake logic to generate and transmit a PHY wake frame that comprises STF's, LTF's, and a new signal field that indicates that the PHY frame is a wake frame as well as the duration of the pending data transmission and the receiver address.

After transmitting a wake frame to a STA indicating buffered data at the AP to be transferred in a subsequent transmission, the AP may wait an interframe space (such as a short interframe space or a shorter interframe space) to allow the receive circuitry of the STA to configure for high linearity/sensitivity mode (element 460). For example, the interframe space necessary for the receive circuitry to switch from an idle state to a receive active state may be shorter than a SIFS if the STA is informed beforehand of the MCS of the pending data packet.

After the AP waits an interframe space to allow the circuitry to configure for high linearity/sensitivity mode, the AP may transmit a data packet to the STA (element 465). In many embodiments, the AP may generate one or more data packets to transmit the buffered data to the STA. In some embodiments, a More Data field may be set in the data frame of the data packet to indicate that additional packets will follow. In such embodiments, the STA may remain in the receive active state until all of the data packets have been received.

The AP may then receive an acknowledgement from the STA confirming receipt (element 470). After transmitting the acknowledgement to the AP, the STA may return to an idle state to reduce power consumption until that STA requires access to the channel again.

The following examples pertain to further embodiments. One example comprises a method. The method may involve determining, by a first communications device, to transmit a data packet to the station; generating, by the first communications device, a wake frame comprising a duration associated with the data packet and a receiver address of the station; transmitting, by the first communications device, the wake frame.

In some embodiments, the method may further comprise receiving a communication from the station to trigger transmission of the data packet to the station, wherein determining to transmit the data packet is in response to the communication. In some embodiments, the method may further comprise generating a data packet to transmit to the station and transmitting the data packet to the station an interframe space after transmission of the wake frame. In many embodiments, transmitting the data packet to the station an interframe space after transmission of the wake frame comprises transmitting the data packet to the station after providing the station time to switch receive circuitry of the station from an idle state to a receive active state. In several embodiments, generating the wake frame comprises generating a medium access control frame with a subtype field including a value indicative of a wake frame. In some embodiments, generating the wake frame comprises transmitting the duration and the receiver address to the physical layer and generating a physical layer wake frame comprising the duration and the receiver address.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may logic to determine to determine to transmit a data packet to the station; to generate a wake frame comprising a duration associated with the data packet and a receiver address of the station to receive the data packet; a physical layer in communication with the logic to transmit the wake frame.

In some embodiments, the apparatus may further comprise an antenna to transmit the wake frame and memory coupled with the logic to store the duration and the receiver address. In some embodiments, the apparatus may further comprise memory coupled with the logic to store the data. In some embodiments, the logic comprises medium access control logic to receive a communication from the station to trigger transmission of the data packet to the station, wherein determining to transmit the data packet is responsive to the communication. In some embodiments, the medium access control logic comprises logic to generate a data packet to transmit to the station and transmit the data packet to the station an interframe space after transmission of the wake frame to the station. In some embodiments, the medium access control logic comprises logic to transmit the data packet to the station after providing the station time to switch receive circuitry of the station from an idle state to a receive active state. In some embodiments, the logic to generate the wake frame comprises physical layer logic to generate a physical layer wake frame with six or more orthogonal frequency division multiplexing symbols. And in some embodiments of the apparatus, the logic to generate the wake frame comprises medium access control logic to generate a medium access control layer wake frame with six or more orthogonal frequency division multiplexing symbols.

Another example comprises a system. The system may logic to determine to determine to transmit a data packet to the station; to generate a wake frame comprising a duration associated with the data packet and a receiver address of the station to receive the data packet; and a physical layer in communication with the logic to transmit the wake frame.

Another example comprises a program product. The program product to wake receive circuitry of a station before receipt of the data by the station may comprise determining to transmit a data packet to the station; generating a wake frame comprising a duration associated with the data packet and a receiver address of the station; and transmitting the wake frame.

Another example comprises a method. The method may involve receiving, by the station, a wake frame indicating a receive address and a duration for a data packet to be transmitted to the receive address; determining, by the station, that the receive address is associated with the station; waking, by the station, receive circuitry of the station from an idle state to a receive active state to receive the data packet in response to the wake frame; and receiving the data frame.

Some embodiments may further comprise transmitting an acknowledgement in response to receiving the data frame and entering an idle state after transmitting the acknowledgement. In some embodiments, the method further comprises generating a communication to trigger transmission of the data packet; switching to a receive active state to receive an acknowledgement responsive to the communication; receiving the acknowledgement; and entering an idle state to reduce power consumption by the receive circuitry. In many embodiments, determining, by the station, that the receive address is associated with the station comprises parsing the wake frame to determine that the frame is a wake frame and then parsing the wake frame to determine the receiver address.

At least one computer program product to wake receive circuitry of a station before receipt of the data by the station, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise logic to receive a wake frame indicating a receive address and a duration for a data packet to be transmitted to the receive address; to determine that the receive address is associated with the station; and to wake receive circuitry of the station from an idle state to a receive active state to receive the data packet in response to the wake frame; and a physical layer coupled with the wake logic to receive the wake frame and to receive the data frame.

In some embodiments, the apparatus may further comprise an antenna coupled with the physical layer logic to transmit the communication, wherein the logic comprises logic to transmit an acknowledgement in response to receiving the data packet and to enter an idle state after transmitting the acknowledgement. In some embodiments, the apparatus may further comprise logic to generate a communication to trigger transmission of the data packet; switch to a receive active state to receive an acknowledgement responsive to the communication; receive the acknowledgement; and enter an idle state to reduce power consumption by the receive circuitry. In some embodiments, logic to parse the wake frame to determine that the frame is a wake frame and then to parse the wake frame to determine the receiver address.

Another example comprises a system. The system may comprise logic to receive a wake frame indicating a receive address and a duration for a data packet to be transmitted to the receive address; to determine that the receive address is associated with the station; and to wake receive circuitry of the station from an idle state to a receive active state to receive the data packet in response to the wake frame; and a physical layer coupled with the wake logic to receive the wake frame and to receive the data frame.

Another example comprises a program product. The program product to coordinate transmissions of devices on a wireless network may comprise a storage medium comprising instructions to be executed by a processor-based device, wherein the instructions, when executed by the processor-based device, perform operations, the operations comprising: receiving, by the station, a wake frame indicating a receive address and a duration for a data packet to be transmitted to the receive address; determining, by the station, that the receive address is associated with the station; waking, by the station, receive circuitry of the station from an idle state to a receive active state to receive the data packet in response to the wake frame; and receiving the data frame.

In some embodiments of the program product, the operations further comprise transmitting an acknowledgement in response to receiving the data frame and entering an idle state after transmitting the acknowledgement. And in some embodiments, the operations further comprise generating a communication to trigger transmission of the data packet; switching to a receive active state to receive an acknowledgement responsive to the communication; receiving the acknowledgement; and entering an idle state to reduce power consumption by the receive circuitry.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. An apparatus to wake receive circuitry of a station, the apparatus comprising:
    memory; and
    logic, at least a portion of which is in hardware, the logic to encode an acknowledgement to transmit in response to decoding a communication received from the station; to determine, after an unknown time interval, to encode a data packet to transmit to the station; to encode a wake frame to transmit after determining to transmit the data packet, to wake the receive circuitry of the station from the idle state to an active state, to facilitate receipt of the data packet by the station; and to encode the data packet to transmit to the station after the unknown time interval.

2. The apparatus of claim 1, the logic to receive a communication from the station, the communication to indicate entry into an idle state by the receive circuitry of the station, the entry into the idle state to facilitate reception of a wake frame by the station to wake the receive circuitry for reception of a data packet by the station.

3. The apparatus of claim 1, further comprising one or more antennas to transmit the wake frame, the memory coupled with the processor to store a receiver address for the wake frame.

4. The apparatus of claim 1, the processor to decode the communication received from the station to trigger transmission of the data packet to the station, wherein determining to transmit the data packet is responsive to the communication.

5. The apparatus of claim 4, the processor to generate the data packet to transmit to the station and to transmit, via the physical layer device, the data packet to the station after transmission of the wake frame to the station.

6. The apparatus of claim 4, the processor to encode the data packet to transmit to the station after providing the station time to switch receive circuitry of the station from the idle state to a receive active state.

7. The apparatus of claim 1, the wake frame to comprise six or more orthogonal frequency division multiplexing symbols.

8. A method to wake receive circuitry of a station, the method comprising:
- transmitting, by a first communications device, an acknowledgement in response to receipt of a communication from the station;
- after an unknown time interval, determining, by the first communications device, to transmit the data packet to the station;
- transmitting, by the first communications device, a wake frame after determining to transmit the data packet, to wake the receive circuitry of the station from the idle state to an active state, to facilitate receipt of the data packet by the station; and
- transmitting, by the first communications device, the data packet to the station after the unknown time interval.

9. The method of claim 8, further comprising receiving, by the first communications device, the communication from the station, the communication to indicate entry into an idle state by the receive circuitry of the station, the entry into the idle state to facilitate reception of the wake frame by the station to wake the receive circuitry for reception of a data packet by the station.

10. The method of claim 8, further comprising receiving a communication from the station to trigger transmission of the data packet to the station, wherein determining to transmit the data packet is in response to the communication.

11. The method of claim 8, further comprising:
- generating the data packet to transmit to the station and transmitting the data packet to the station an interframe space after transmission of the wake frame.

12. The method of claim 11, wherein transmitting the data packet to the station an interframe space after transmission of the wake frame comprises transmitting the data packet to the station after providing the station time to switch receive circuitry of the station from the idle state to a receive active state.

13. The method of claim 8, wherein generating the wake frame comprises generating a medium access control frame with a subtype field including a value indicative of a wake frame.

14. The method of claim 8, wherein transmitting the wake frame comprises transmitting a duration and a receiver address to the physical layer and generating a physical layer wake frame comprising the duration and the receiver address.

15. A program product to wake receive circuitry of a station, the program product comprising:
- a computer-readable medium comprising instructions to be executed by a processor-based device, wherein the instructions, when executed by the processor-based device, perform operations, the operations comprising:
- transmitting an acknowledgement in response to receipt of a communication;
- determining, after an unknown time interval by a first communications device, to transmit a data packet to the station;
- transmitting a wake frame after determining to transmit the data packet, to wake receive circuitry of the station from the idle state to an active state, to facilitate receipt of the data packet by the station; and
- transmitting the data packet to the station after the unknown time interval.

16. The machine accessible product of claim 15, wherein the operations further comprise:
- receiving the communication from the station, the communication to indicate entry into an idle state by the receive circuitry of the station, the entry into the idle state to facilitate reception of the wake frame by the station to wake the receive circuitry for reception of the data packet by the station.

17. The machine accessible product of claim 15, wherein the operations further comprise:
- receiving a communication from the station to trigger transmission of the data packet to the station, wherein determining to transmit the data packet is in response to the communication.

18. The machine accessible product of claim 17, wherein the operations further comprise:
- generating the data packet to transmit to the station and transmitting the data packet to the station an interframe space after transmission of the wake frame.

19. The machine accessible product of claim 18, wherein transmitting the data packet to the station an interframe space after transmission of the wake frame comprises transmitting the data packet to the station after providing the station time to switch receive circuitry of the station from the idle state to a receive active state.

20. The machine accessible product of claim 15, wherein generating the wake frame comprises generating a medium access control frame with a subtype field including a value indicative of a wake frame.

21. The machine accessible product of claim 15, wherein transmitting the wake frame comprises transmitting a duration and a receiver address to the physical layer and generating a physical layer wake frame comprising the duration and the receiver address.

22. A method to wake receive circuitry of a station, the method comprising:
- receiving an acknowledgement responsive to a communication;
- entering an idle state to reduce power consumption by the receive circuitry;
- waiting, in the idle state, an unknown time interval to receive the data packet;
- receiving, by the station, the wake frame, while the receive circuitry of the station remains in the idle state;
- waking, by the station, the receive circuitry of the station from the idle state to a receive active state to receive the data packet in response to the wake frame; and
- receiving the data packet after the unknown time interval.

23. The method of claim 22, further comprising transmitting the communication, the communication to indicate entry into the idle state by the receive circuitry of the station, the entry into the idle state to facilitate reception of the wake frame by the station to wake the receive circuitry for reception of the data packet by the station; and switching to a receive active state to receive the acknowledgement responsive to the communication.

24. The method of claim 22, further comprising transmitting an acknowledgement in response to receiving the data frame and entering the idle state after transmitting the acknowledgement.

* * * * *